United States Patent [19]

Hämäläinen et al.

[11] Patent Number: 5,627,243

[45] Date of Patent: May 6, 1997

[54] FLUIDIZED-BED REACTOR

[75] Inventors: Matti Hämäläinen, Monninkylä; Isto Eilos, Porvoo; Simo Jortikka, Helsinki; Tuomo Hyvönen, Porvoo, all of Finland

[73] Assignee: Borealis Polymers Oy, Porvoo, Finland

[21] Appl. No.: 362,248

[22] Filed: Dec. 22, 1994

[30] Foreign Application Priority Data

Dec. 27, 1993 [FI] Finland ................................. 935856

[51] Int. Cl.⁶ ............................................. C08F 2/34
[52] U.S. Cl. ............................. 526/68; 526/88; 526/901
[58] Field of Search ........................ 526/68, 88, 901

[56] References Cited

U.S. PATENT DOCUMENTS 4,877,587  10/1989  Rhee et al. ........................ 422/135

Primary Examiner—Thomas R. Weber
Attorney, Agent, or Firm—Steinberg, Raskin & Davidson, P.C.

[57] ABSTRACT

The invention relates to a fluidized-bed reactor for polymerization of olefins, said reactor comprising an upper section of the reactor acting as a polymerization space in which olefin monomers are polymerized in a fluidized bed formed by polymerizing particles and a lower section of the reactor acting as a mixing space through which circulating gas removed from the top of the polymerization space is passed to the fluidized bed contained in the lower part of the polymerization space through a horizontal gas distributor plate in order to maintain the fluidized state of the bed, in which arrangement the circulating gas is passed to the lower section of the reactor via one or more inlet nozzles and the bottom section of the reactor is additionally provided with means for directing the circulating gas. At least part of said means for directing the circulating gas flow is comprised of flow control elements formed by plate-like surfaces perforated with a number of holes and located so that a major part of the gas flow is directed sideways below said means and a minor part of the gas flow is directed upwards to pass through said holes in said means.

10 Claims, 4 Drawing Sheets

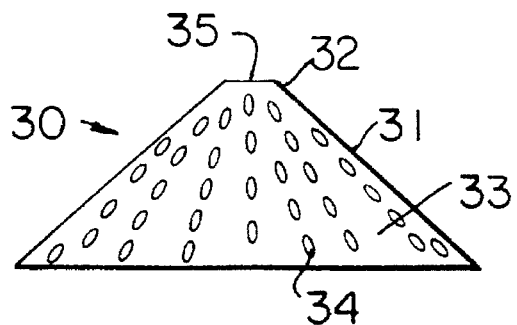
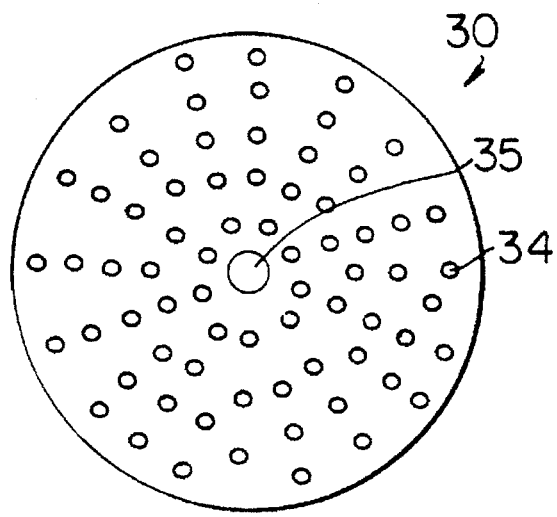
FIG.2a  FIG.2b
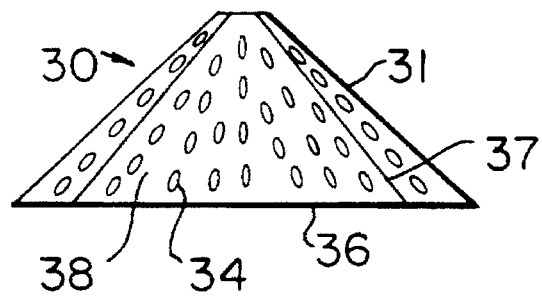
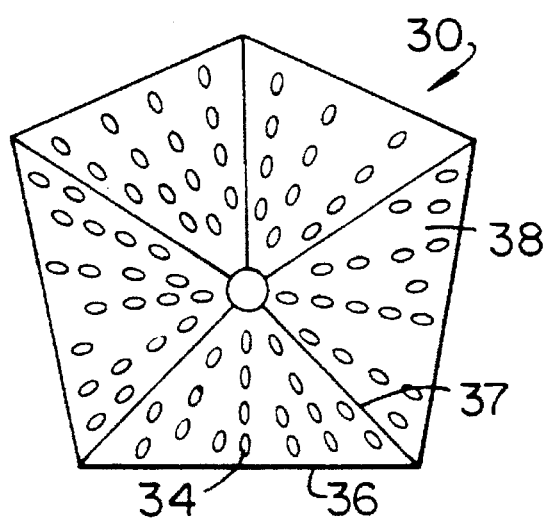
FIG.3a  FIG.3b

FLUIDIZED-BED REACTOR

BACKGROUND OF THE INVENTION

The invention relates to a fluidized-bed reactor suited for polymerization or copolymerization of olefins. The invention particularly concerns a fluidized-bed reactor having its bottom section equipped with means for uniform distribution of the circulation gas passed to the bottom of the reactor over the entire cross section of the reactor.

Fluidized-bed reactors are conventionally used in the continuous gas-phase polymerization of olefins into their homo- and copolymers. In a fluidized bed the polymerization reaction is carried out in a bed comprised of polymer particles formed during polymerization, whereby the bed is kept in the fluidized state with the help of a circulating gas flow directed upward from the bottom section of the reactor. The circulating gas flow includes both the gaseous monomers to be polymerized and inert gases and/or gaseous hydrocarbon diluents. The circulating gas flow is removed from the top of the reactor upper section, passed to heat exchangers for the recovery of heat produced by the polymerization reaction and finally returned to the bottom section of the reactor with the help of a compressor.

A uniform distribution of the circulating gas passed to the lower section of the reactor is mandatory for maintaining a steady state of fluidization. The distribution of the circulating gas is conventionally accomplished by means of a flow distributor element formed by a perforated intermediate dividing plate which is placed close to the bottom of the reactor vessel. Thus, an infeed/mixing chamber of the circulating gas is formed at the bottom section of the reactor separately from the fluidized bed layer, that is, the ordinary polymerization space.

The larger the reactor vessel volume, the more difficult it is to achieve uniform distribution of the circulating gas in the fluidized bed over the entire cross section of the reactor. Due to the friction caused by the wall to the flow, also very small reactors present similar problems in attempts to achieve uniform cross-sectional distribution of the flow. As a result of the non-uniform flow distribution, the fluidized bed gradually develops denser or less fluidized spots, particularly in the vicinity of the walls. This problem is worse when liquid fractions enter into the reactor along with the circulating gas. A uniform distribution of liquid phase components into the fluidized bed is particularly difficult to achieve. Consequently, the operation of the fluidized bed will deteriorate due to local overheating and agglomeration of polymer particles into larger clumps, as well as adherence of such agglomerates to the reactor walls.

To improve the uniformity of gas flow distribution, use of such gas distributor plates have been proposed in which the size, shape and location of the holes have been modified. However, the manufacture of such gas distributor plates is costly and their gas permeability may be inadequate thus causing unneeded pressure drops in the gas circulation through the reactor. Furthermore, accumulation of polymer clumps under the gas distributor plate is possible as the polymerizing particles entrained in the circulating gas flow may adhere to the wetted areas that can develop to the underside of the distributor plate.

Another common problem occurring with larger sizes of fluidized-bed reactors is the agglomeration of polymer particles and the adherence thereof to the wall surfaces of the reactor bottom section. This is because the circulating gas inevitably carries away from the reactor minor amounts of entrained, small polymer particles containing active catalyst that are then returned to the bottom section of the reactor in the circulating gas flow. If the circulating gas is passed to the reactor in the conventional manner via a straight tubular nozzle located at the reactor bottom and if the flow conditions or the shape of the reactor bottom are not optimal, accumulation of polymer particles within the feed chamber of the circulating gas begins. To eliminate this disadvantage, different types of flow distributor elements have been proposed for use connected to the circulating gas feed pipe. Accordingly, U.S. Pat. No. 4,877,587, for example, has at the reactor bottom the circulation gas feed pipe provided with distributor means which divide the flow exiting the pipe into two portions so that one portion of the flow is directed upward. In this case the division of the flow is implemented by means of a cap-shaped element having one large center opening on its upper surface and large openings on its sides. Hence, a portion of the flow is directed upward while the other portion is directed sideways. Such an embodiment has the disadvantage that the plain surfaces of the flow distributor element surrounding the circulating gas inlet flow opening tend to collect polymer particles from the circulating gas flow. Finally, large polymer clumps will grow on the flow distributor element. Also these embodiments cannot entirely prevent the occurrence of local vortexes in the bottom section of the reactor and resulting agglomeration and adherence of polymer particles on the wall surfaces. Removal of the polymer clumps and cleaning of distributor elements is clumsy and invariably requires reactor shutdown, opening and cleaning of its bottom section, which is an awkward and costly operation.

The typical shape for a fluidized-bed reactor comprises a more or less hemispherical surface similar to that described in cited U.S. Pat. No. 4,877,587. The benefit of such a shape of the bottom dome over a flat bottom is that the side of the reactor bottom section is free of any sharp-angled corners which might impede the gas flow and thus cause agglomeration of polymer particles. If the inlet arrangement of the circulating gas flow would be via a feed pipe or opening located at the center of the bottom, such an arrangement would fail in commercial reactors having a bottom diameter of up to several meters.

SUMMARY OF THE INVENTION

The present invention concerns a fluidized-bed reactor capable of overcoming the above-described problems of non-uniform flow of the circulating gas and eliminating the disadvantages of arrangements used in conventional polymerization reactors.

Accordingly, the present invention is related to a fluidized-bed reactor for polymerization of olefins, the reactor comprising an upper section of the reactor acting as a polymerization space in which olefin monomers are polymerized in a fluidized bed formed by polymerizing particles and a lower section of the reactor acting as a mixing space through which the circulating gas removed from the top of the reactor is passed to the fluidized bed contained in the polymerization space through a horizontal gas distributor plate in order to maintain the fluidized state of the bed, in which arrangement the circulating gas is passed to the lower section of the reactor via one or more inlet nozzles and the bottom section of the reactor is additionally provided with means above the nozzles for directing the circulating gas. The fluidized-bed reactor according to the invention is characterized in that at least part of said means for directing the circulating gas flow comprises of flow control elements formed by plate-like surfaces perforated with a number of holes and located so that a major part of the gas flow is directed sideways below the means and a minor part of the gas flow is directed upwards to pass through the holes in the flow means.

In the simplest embodiment, the flow control surfaces comprise perforated planar elements placed above the inlet nozzle for the circulating gas. Owing to the perforation, the circulating gas can always also flow through the flow directing element, and the flow thus established is capable of effectively preventing the accumulation of polymer particles onto the flow directing element. The size and number of perforation holes is selected so that only a minor portion of the circulating gas flow passes through the flow control element while the rest of the flow is directed sideways. Preferably from about 10 to about 20 percent of the flow passes through the holes and a major part of the flow is directed sideways below the flow control element. A suitable hole size can be selected in the range of about 1 to about 80 mm, typically in the range about 4 to about 25 mm, while the proportion of the perforation from the total area of the flow control element is in the range from about 1 to about 50%. In this embodiment the entire surface of the flow control element is preferably provided with uniform perforation. Such planar flow control elements are normally advantageously oriented essentially horizontally, while also an inclined position of the flow control element is possible, particularly if so required by the shape of the reactor bottom.

According to a more preferred embodiment of the invention, the flow control elements are formed by conical surfaces which are perforated. In this context, the term conical surface must be understood to refer to a generalized shape of a conical or pyramidal cap with a cross section approximating an upward tapering cone. Hence, such a flow control element may be shaped as, e.g., an upward tapering cone with a surface of revolution. More preferably the flow control element is assembled from triangular, planar pieces which are then welded together at their edges so as to form a pyramidal element with a polyhedral surface. The advantages of this kind of flow control element are that it is easier to assemble and the edge of the element opposite to the reactor wall more closely follows the curvature of the reactor wall. Preferably the side walls of the flow control element are formed from four, more preferably from at least five triangular planar pieces welded together.

The tip of the conical or pyramidal flow control element is oriented upward. The side surfaces are perforated, whereby at least a portion of the circulating gas flow can pass through the walls of the element thus keeping them free from adhering polymer particles. The tip of the flow control element is advantageously cut open, whereby an upward opening hole is formed. The sole purpose of such an opening is to provide admission for larger polymer particles possibly entrained in the circulating gas flow. If such larger polymer clumps cannot find a path through the perforation made to the flow control element, they may adhere to the underside of the flow control element and thus form a starting point for still larger agglomerations that would gradually plug the entire underside of the flow control element.

Also in this embodiment the perforation may be evenly distributed over the entire area of all side surfaces, or alternatively, selectively placed so that a portion of the side surfaces is provided with no or less dense or more dense perforation than the other side surfaces. A suitable hole size can be selected in the range of about 1 to about 80 mm, advantageously in the range from about 4 to about 25 mm. Preferably, due to reasons of simplified manufacture, the holes are of equal size, while perforation with holes of different sizes is also feasible when desired. The proportion of the perforation from the total area of the flow control element is generally in the range of about 1 to about 50%, advantageously in the range of about 5 to about 10%.

When a flow control element shaped as an upward pointing pyramid is used, the tip angle of the element is typically selected in the range of about 70 to about 150 degrees, advantageously in the range from about 90 to about 120 degrees. Element tip angles smaller or larger than these generally cause greater or smaller flow rate, respectively, in the vicinity of the reactor wall than in the center of the reactor. Obviously, selected hole size and degree of perforation contribute to the flow situation. Furthermore, it must be noted that the pyramidal flow control element need not necessarily be oriented upward, but rather, it can be tilted by a certain amount, e.g., from about 1 to about 20 degrees, thus making it possible to effect the gas flow rates.

The flow control elements according to the above-described embodiments are advantageously placed above the inlet nozzles of the circulating gas so that a portion of the circulating gas can flow sideways from under the flow control element. The spacing of the flow control element from the inlet opening of the circulating gas may then be selected on the basis of the flow velocity and rate required for maintaining the fluidized state of the polymer bed as well as on the basis of the degree of perforation and size of perforation holes so that a desired portion of the circulating gas flow is directed upward and/or passes through the flow control element and another desired portion of the gas flow is directed sideways from under the flow control element. The optimum vertical distance of the lowest point of the pyramidal flow control element from the inlet nozzle for the circulating gas is also dependent on the diameter of the inlet nozzle and the diameter of the reactor bottom section. Accordingly, the proper distance can be selected in the range of from about 0.1 to about 50×d, or alternatively, in the range of from about 0.1 to about 0.5×D, where d is the diameter of the inlet nozzle for the circulating gas and D is the diameter of the reactor bottom section, respectively.

Large commercial fluidized-bed reactors may possibly require more than one inlet nozzle for the circulating gas in order to achieve uniform distribution of the circulating gas flow over the entire cross section of the reactor. This is particularly necessary in cases where the center of the reactor bottom is vertically upward bulged, whereby such a cake-mold-shaped bottom part as the one described in FI patent 91971 for example is formed. Then, the number of circulating gas inlet nozzles is advantageously at least two, even more advantageously at least three. Herein, the inlet nozzles of the circulating gas are advantageously placed symmetrically so that they are equidistant from each other.

According to another preferred embodiment of the invention, packings placed in the spaces between the inlet nozzles of the circulating can be used as the flow control elements. With the help of the packing elements, the reactor bottom can be contoured to a shape which is more favorable to the flow dynamics. In large reactors the volume occupied by packing elements, and also their weight when using solid packing, become excessively large. Consequently, the packing elements are preferably made into hollow pieces. Due to the high operating pressure prevailing in the reactor, the required wall thickness of such a hollow piece may become rather substantial. However, the inside of the packing element can be pressurized to or close to the reactor operating pressure, whereby the packing element wall thickness required by mechanical durability may be essentially reduced. Pressurization can be advantageously implemented by routing the pressure of the circulating gas or any other gas to the interior of the packing element. This embodiment is especially advantageous in reactors, in which the bottom section of the reactor is "cake-mold" like according to the Finnish patent application 92-1632 (corresponds U.S. Ser. No. 046,557, filed Dec. 04, 1993, now U.S. Pat. No. 5,395, 595 the disclosure of which is hereby incorporated by reference herein). In this kind of bottom section it is more difficult to obtain even gas flows.

Also the walls of the packing elements may be entirely or partially perforated, and a portion of the feed gases may be passed to the reactor via the packing elements. Then, the gas flow passing via the holes of the packing elements keeps the surfaces of the packing pieces free from adhering polymer particles. In this embodiment the gases passed via the interior of the packing elements are preferably only such gases, e.g., inert gases, monomers or hydrogen, that do not contain polymerized or polymerizing particles which might be accumulated to the interior of the packing element, wherefrom their removal is practically impossible.

BRIEF DESCRIPTION OF THE DRAWINGS

The different embodiments of the invention are next examined in greater detail with reference to annexed drawings in which:

FIGS. 2a and 2b are side and top views, respectively, of an embodiment of the circulating gas flow control element according to the invention;

FIGS. 3a and 3b are side and top views, respectively, of another embodiment of the circulating gas flow control element according to the invention;

DETAILED DESCRIPTION OF THE PREFERRED EMBODIMENTS

Figure 1:
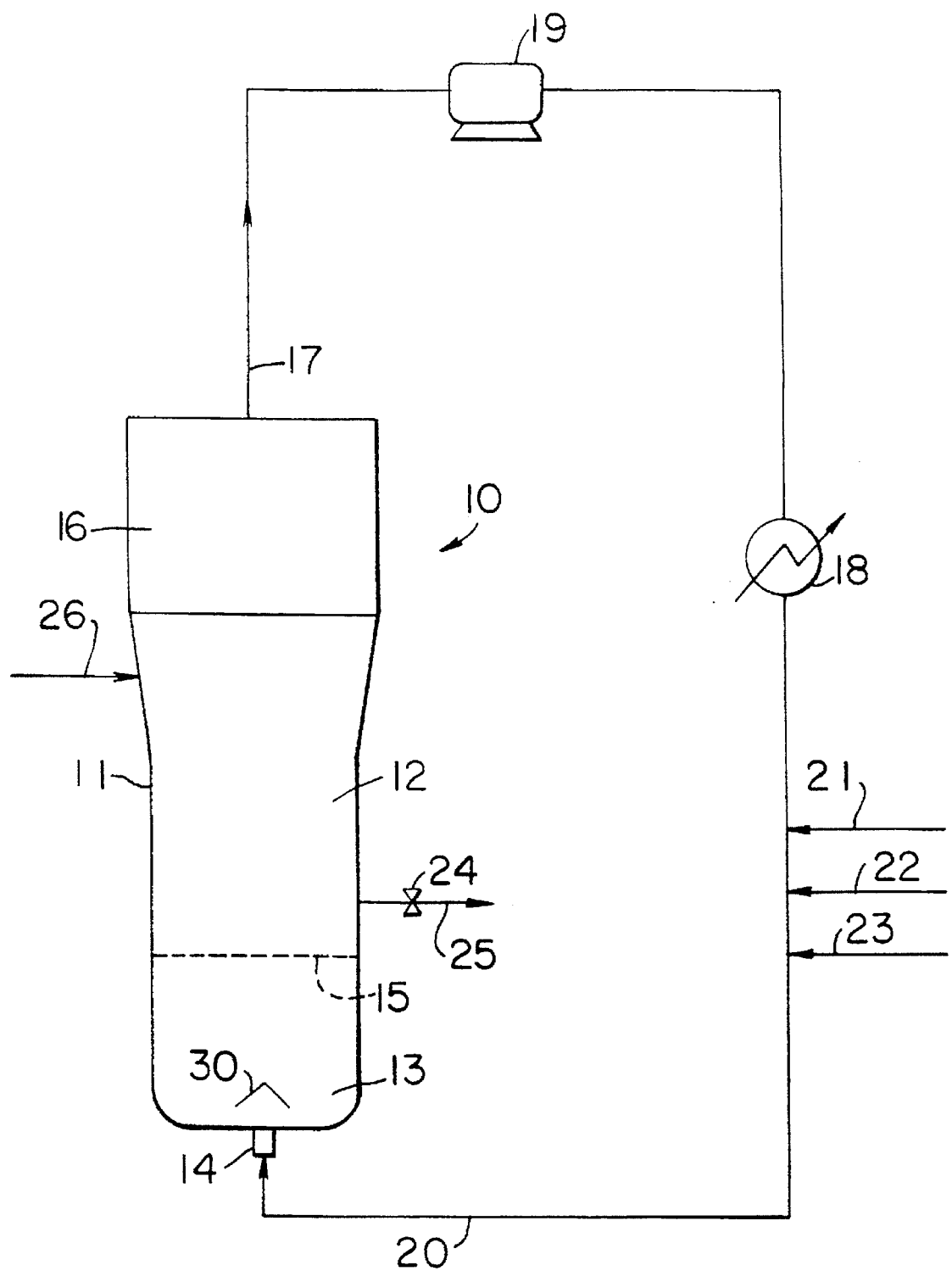
FIG. 1 is a generalized diagrammatic flow diagram of a fluidized-bed reactor and its gas flow.

With reference to FIG. 1, the upper section 11 of a fluidized-bed reactor 10 forms a polymerization space 12 in which olefin monomers are polymerized in a fluidized bed containing polymerizing particles in the presence of an olefin polymerizing catalyst system. The lower section of the reactor forms a mixing space 13 in which the circulating gas flow passing into the reactor via a circulating gas inlet nozzle 14 is distributed into a maximally uniform, upward directed flow. The polymerization space 12 and the mixing space 13 are separated from each other by a gas distributor plate 15 whose function is to promote uniform entry of the circulating gas into the fluidized bed and to prevent the backflow of polymer particles contained in the fluidized bed to the mixing space 13. Gas is continuously removed from the gas space 16 at the upper part of the polymerization space 12 via an outlet line 17. To the outlet line 17 are adapted heat exchanger means 18 for cooling the gas removed from the reactor 10 and a compressor 19 serving to pump the cooled circulating gas back to the lower section 13 of the reactor 10 via a line 20 and a nozzle 14. A flow control element placed above the inlet nozzle 14 of the circulating gas is denoted by a common reference numeral 30.

Monomers are fed to the circulating gas line 20 via a line 21, while the optional comonomers and hydrogen can be fed via lines 22 and 23. The product is removed from the fluidized-bed reactor 10 via a valve 24 and a line 25. In the case the fluidized-bed reactor is preceded by another polymerization step, the polymer feed taken therefrom can be passed to the fluidized-bed reactor 10 via a line 26.

With reference to FIGS. 2a and 2b, such an embodiment of the circulating gas flow control element according to the invention is shown in which the control element 30 comprises a cap-like flow control element formed by a cone 31 with a surface of revolution having its tip 32 pointed upward. The conical surface 33 of the flow control element 30 is provided with perforation 34 which in this embodiment is arranged substantially evenly divided on all side surfaces of the element. Additionally, the tip 32 of the flow control element 30 may be provided with an opening 35 which lets larger polymer particles possibly entrained in the circulating gas flow to go through.

With reference to FIGS. 3a and 3b, another preferred embodiment of the circulating gas flow control element according to the invention is shown in which the control element 30 comprises a pyramidal, upward pointed flow control element formed by substantially triangular sheet metal pieces 36 having their edges 37 welded together. The side surfaces 38 of the pyramidal flow control element 30 are provided with perforation 34.

Figure 4:
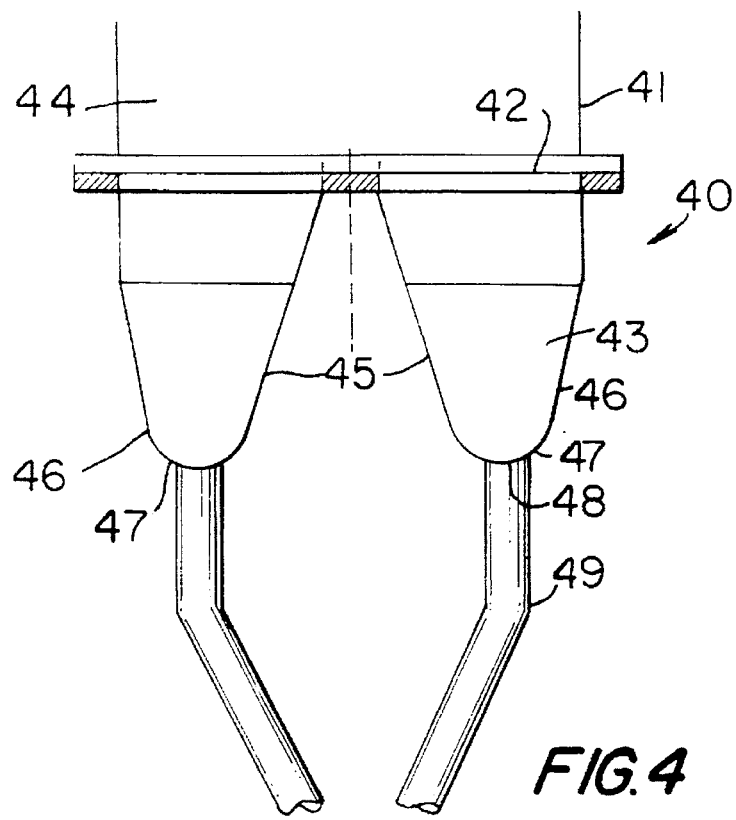
FIG. 4 is a side view of the construction of "cake-mold"-shaped bottom of the fluidized-bed reactor.

FIG. 4 discloses a fluidized-bed reactor 40 of special design described in greater detail in FI patent 91971 and 921632. The reactor 40 has a cylindrical outer wall 41. A perforated gas distributor plate 42 divides the reactor 40 into an inlet section or a mixing space 43 of the circulating gas, and a fluidized-bed or a polymerization space 44. The bottom part of the reactor is comprised of two concentrical conical surfaces of revolution of which the inner conical wall surface 45 is tapered upward and the outer conical wall surface 46 is tapered downward. The conical surfaces 45, 46 are joined to each other by an annular section 47 of essentially semicircular cross section which forms the lowermost part of the reactor bottom.

The inlet nozzles 48 of the circulating gas are located at the lowermost point of the reactor bottom. The circulating gas flow is passed via the circulating gas feed pipe 49 through the inlet nozzles 48 to the bottom part 43 of the reactor 40 and further through the gas distributor plate 42 to the fluidized bed contained in the polymerization space 44. To achieve more uniform flow, a greater number of the flow control elements are advantageously used and they are preferably located symmetrically with respect to each other.

Figure 5A:
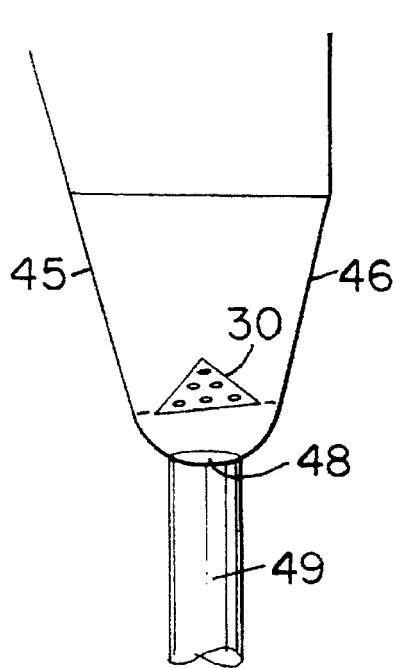
FIGS. 5a and 5b are side and top views, respectively, of the flow control element according to the invention adapted to the fluidized-bed reactor bottom structure illustrated in FIG. 4.
Figure 5B:
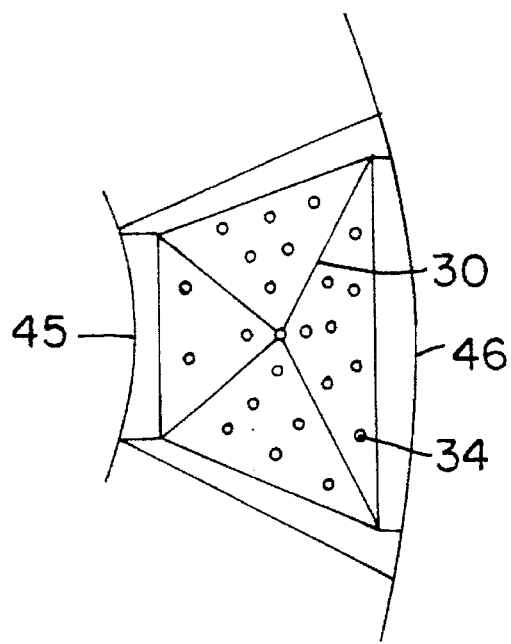

With reference to FIGS. 5a and 5b, a flow control element 30 is shown placed above the inlet nozzle 48 in the bottom section of the reactor illustrated in FIG. 4, whereby the control element in this case is a pyramidal flow control element with perforation 34 of the type illustrated in FIGS. 3a and 3b. With reference to FIG. 5a, the flow control element 30 may also be slightly tilted.

Figure 6A:
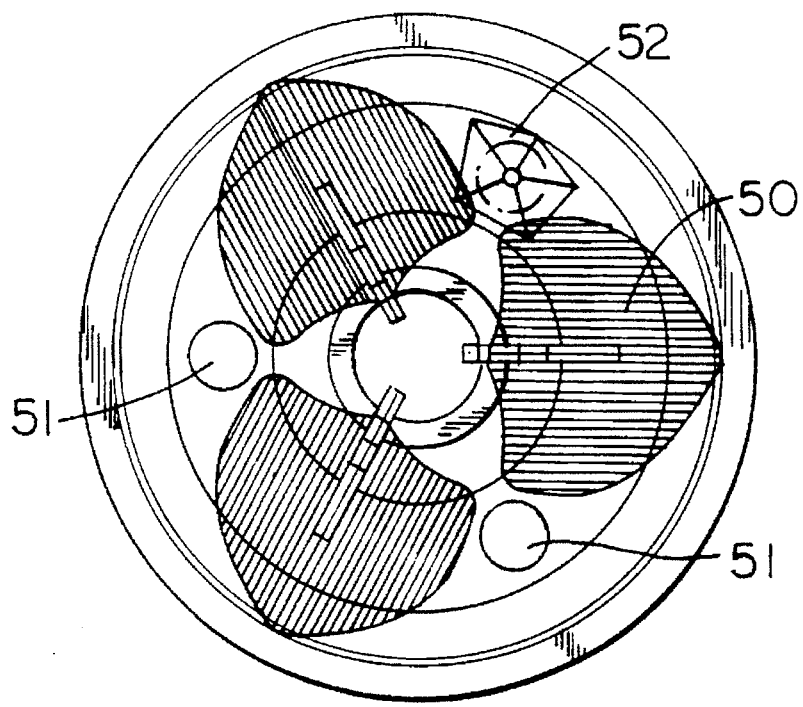
FIGS. 6a and 6b are top and oblique top views, respectively, of the fluidized-bed reactor bottom structure illustrated in FIG. 4 having the reactor bottom additionally provided with packing pieces acting as the flow control elements for the circulating gas.
Figure 6B:
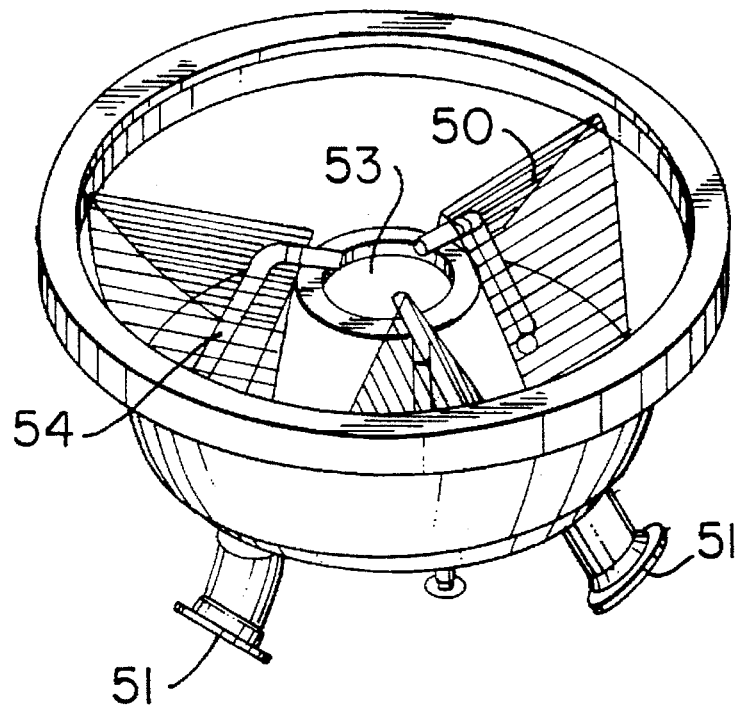

With reference to FIGS. 6a and 6b, an embodiment according to the invention is shown in which the reactor bottom structure illustrated in FIG. 4 is complemented with flow control elements 50 designed to serve as packing elements. In the illustrated case the packing elements 50 are located symmetrically between the inlet nozzles 51 or the flow control element 52 situated above the inlet nozzles.

Owing to the packing elements 50, the free volume of the reactor space above the inlet nozzles 51 is reduced, whereby the circulating gas flow paths are forced to bend upward along the flow channel expanding essentially from its bottom upward.

The packing pieces 50 can be made from a relatively thin sheet material in the case the edges of the packing elements are not attached in a gas-tight manner to the sides of the reactor bottom part. Then, the operating pressure of the reactor can freely enter the inside space of the packing elements. Obviously, the interior of the packing elements can alternatively be pressurized by routing the pressure of the circulating gas, or any other gas with a pressure close to the operating pressure of the reactor, to the interior of the packing elements via separate pipes (not shown). The shape of the reactor bottom illustrated in the diagram is particularly intended for use in a fluidized-bed reactor equipped with a stirrer, whereby the stirrer drive shaft with its bearings (not shown) is adapted to a center hole 53 in the manner described FI patent application 933073. Then, the pipes 54 required for flushing the feed-through seal of the stirrer drive shaft and passing the flushing gas through the stirrer drive shaft can be advantageously taken via the packing elements 50, whereby the pipes remain well protected and displaced from obstructing the circulating gas flow.

What is claimed is:

1. A method for polymerizing or copolymerizing olefins in a fluidized bed reactor, comprising:

providing a fluidized-bed reactor for polymerization of olefins having an upper section acting as a polymerization space in which olefin monomers are polymerized or copolymerized to form polyolefins, directing a circulating gas flow and monomers into a lower section of said reactor via one or more inlet nozzles, directing at least part of the circulating gas flow through flow control elements situated in said lower section, wherein from about 1 to about 50 percent of a surface area of said flow control elements are perforated with holes having a diameter of from about 1 to about 80 mm such that a major part of the gas flow is directed sideways and a minor part of the gas flow is directed upward through said holes, said perforated flow control elements being selected from the group consisting of planar elements, conical elements and combinations thereof, and passing said circulating gas flow and monomers from the lower section of the reactor through a horizontal gas distributor plate into said upper section, whereby said olefins are polymerized or copolymerized.

2. The method of claim 1, wherein said flow control elements are comprised of cones assembled from triangular plates welded together.

3. The method of claim 2, wherein said flow control elements comprise cap elements, said cap elements comprising a cross section approximating an upward tapering cone and having their tips provided with an opening and side surfaces perforated.

4. The method of claim 1, wherein said flow control elements are adapted to the inlet nozzles of the circulating gas.

5. The method of claim 1, wherein said flow control elements are comprised of packing elements adapted in the space remaining between said inlet nozzles.

6. The method of claim 5, wherein said packing elements are hollow and have their interior space separated in a gas-tight manner from the mixing space and the method comprises pressurizing the interior space to a pressure equal to reactor operating pressure.

7. The method of claim 6, wherein said pressurizing step further comprises the step of routing the pressure of the circulating gas or other processed gas to the interior of said packing elements.

8. The method of claim 5, wherein said packing elements are hollow and at least partially perforated.

9. The method of claim 5, wherein the reactor is equipped with a stirrer reaching up to the fluidized bed, and the method comprises passing stirrer flushing gas into the reactor via a flow channel adapted to the stirrer drive shaft and agitator arm, wherein the piping required for passing the flushing gas into the hollow stirrer drive shaft is taken via the packing elements.

10. A method for polymerizing or copolymerizing olefins in a fluidized bed reactor, comprising:

providing a fluidized-bed reactor for polymerization of olefins having an upper section acting as a polymerization space in which olefin monomers are polymerized or copolymerized to form polyolefins, directing a circulating gas flow and monomers into a lower section of said reactor via one or more inlet nozzles, directing at least part of the circulating gas flow through flow control elements situated in said lower section, perforated with holes such that a major part of the gas flow is directed sideways and a minor part of the gas flow is directed upward through said holes, said perforated flow control elements being selected from the group consisting of planar elements, conical elements and combinations thereof, and passing said circulating gas flow and monomers from the lower section of the reactor through a horizontal gas distributor plate into said upper section, whereby said olefins are polymerized or copolymerized.

* * * * *